Aug. 2, 1966   A. E. TSCHANZ   3,263,520

FLEXIBLE CONDUIT WITH MOLDED END FITTING

Filed July 26, 1963

INVENTOR

BY *August E. Tschanz*

*Barnard, McGlynn & Reising*
ATTORNEYS

United States Patent Office 3,263,520
Patented August 2, 1966

3,263,520
FLEXIBLE CONDUIT WITH MOLDED
END FITTING
August E. Tschanz, Chalfont, Pa., assignor to Teleflex Incorporated, North Wales, Pa., a corporation of Delaware
Filed July 26, 1963, Ser. No. 297,900
16 Claims. (Cl. 74—501)

The present invention relates to an improved, flexible control and method for making same. More specifically, the subject matter of this invention is an improved structure and method for manufacturing a flexible control guide conduit preferably of the type having an inner flexible tube surrounded by a flexible sheath in turn surrounded by a flexible protective casing. A core element is supported for movement, longitudinal, rotary or both, within the flexible tube for transmitting motion.

Flexible guide conduits of the type described are well known, as illustrated by U.S. Patent 3,063,303 granted to A. A. Cadwallader on November 13, 1962, and are commonly used, for example, as flexible controls in marine, aircraft and other automotive vehicles and the like. Such a conduit wherein the sheath comprises a plurality of wires wrapped about the inner tube on a long lead has the outstanding feature of providing good flexibility while accommodating relatively high tension, compression and radial loads thereby assuring against rupture and minimizing losses in motion transmitting efficiency. For optimum flexibility of such a conduit, commensurate with accommodating the high tensile, compression and radial loads, it is desirable that the helically wound wires be able to undergo a slight amount of slidable movement to and fro relative to each other and relative to the inner tube and the surrounding protective casing. For example, it has been found advantageous, as an assist in enabling such sliding movement, that there be a little space between the wires, albeit a full complement of wires is used to provide optimum strength. Further, it has been proposed to minimize the relatively high frictional contact between adjacent wires by interposing plastic between the wires so as to further enhance their ability to slide with respect to each other, reference here being made to U.S. patent application S.N. 191,978 filed May 2, 1962 in the name of Donald R. Pierce, and now Patent No. 3,192,795, and S.N. 214,142 filed August 1, 1962 in the name of Donald R. Pierce, and now Patent No. 3,177,901. However, in all such flexible conduits, and particularly in those wherein specific provision is made to further enhance flexibility as alluded to above, there is a serious problem in that upon repeated flexing of the conduit, the wires tend to be worked toward and out of the ends of the conduit thereby destroying or a least stressing the end fittings. For this reason, it has heretofore been necessary to use conduit end fittings which, by reason of materials and manufacturing costs, are relatively expensive. Further, even these relatively expensive fittings have not been entirely satisfactory in providing a really good end anchor for the conduit without at the same time detracting from cable flexibility by interference with the ability of the wires to undergo slight movement with respect to each other and with respect to the inner tube and the protective casing. A further and related problem at the present state of the art is that of obtaining fittings on the conduit intermediate the ends thereof to provide a means for attaching the conduit to a supporting structure, for example the hull of a boat, without at the same time detracting from the strength, flexibility and other useful characteristics of the conduit. For example, the common practice of employing a metal fitting which clamps the conduit to its supporting structure in order to prevent longitudinal movement of the conduit is disadvantageous since, if the clamp is left relatively loose, there is poor securement whereas if the clamp is tightened the resulting inwardly directed radial pressure impairs the flexibility of the conduit for the reason mentioned above, i.e., by reducing the ability of the helically wound wires to undergo slight sliding movement.

It is an object of the present invention to provide a flexible control and guide conduit therefor of the type described having a fitting which is firmly secured to the conduit and yet without impairment to the strength, flexibility or other useful characteristics of the conduit.

Another object of the invention is the provision of an improved, relatively low cost method for manufacturing a flexible guide conduit and, more specifically, for securing a fitting to a conduit of the type described.

Briefly, these objects are accomplished in accordance with the invention by a plastic, i.e., an organic polymeric fitting which is intimately bonded to the outer protective casing of the flexible conduit. Hence, by reason of the intimate bond between the fitting and the casing, the fitting is fixably and durably secured to the conduit and yet without dependence on radially inwardly directed pressure which would impair the ability of the helically wound wires underneath the protective covering to slide with respect to each other and with respect to the protective covering and the inner tube. Where the fitting is an end fitting, as in the preferred embodiment, it is formed with a radially inwardly extending annular flange which abuts the end surfaces of the helically wound wires thereby assuring against their being worked out of the conduit due to repeated flexing or otherwise. In one preferred embodiment of the invention, the end portions of the protective casing, the wires and the inner tube are flared outwradly, such flared ends being imbedded in the plastic fitting to provide a mechanical interlock and therefore an even stronger attachment between the fitting and the conduit. Such embodiment is specifically covered in United States patent application Ser. No. 297,899 filed concurrently herewith in the name of Winthrop B. Conrad and assigned to the assignee of the present invention. Further in accordance with the present invention, the plastic fitting is preferably formed to the conduit by molding the plastic to the desired shape against the conduit casing such that the fitting is both formed and intimately bonded to the conduit in such operation.

Other objects, features and advantages of the invention will appear more clearly from the following detailed description of preferred embodiments thereof made with reference to the accompanying drawings in which.

Figure 1:
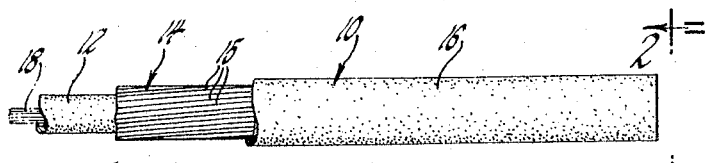
FIGURE 1 is a fragmentary side view, with parts cut away, of a flexible conduit of the type to which the invention relates.
Figure 2:
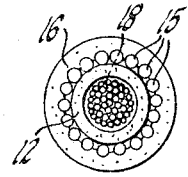
FIGURE 2 is a sectional view of the conduit taken on the line 2—2 of FIGURE 1, but in larger scale

Referring now to the drawings wherein like members are identified by the same numerals, FIGURES 1 and 2 show a flexible guide conduit 10 comprising an inner tube member 12 overlaid with a sheath 14 formed by a plurality of wires 15 helically wound on a long lead about the inner tube member 12, this sheath 14 in turn being covered with a flexible casing 16. The assembly, as used, includes a movable core element 18 disposed within the inner tube member 12.

Tube member 12 may be formed in any desired manner and of a suitable material so as to insure its flexibility and provide a low-friction support to permit core element 18 to be freely slidably movable therewithin. While tubular member 12 may thus assume many forms, it is preferred that it be made of an extruded organic plastic material having inherent lubricity. Highly desirable materials are the superpolyamide resins, commonly known as nylon, and polytetrafluoroethylene also known as Teflon. Such materials have particularly demonstrated their capacity for use in this general type of environment. In those instances where the operating requirements are not too severe and where lower conduit costs are important, less expensive plastic materials such as polyethylene, polypropylene, etc., may be used to advantage.

Any of the aforementioned organic plastics may also be used for the flexible casing 16 which, like tube member 12, is generally formed by extrusion. In addition, the various other plastics such as the polyvinyls, for example, plasticized polyvinylchloride, may be used for the casing 16, the importance of low friction or lubricative properties being less important for the material of casing 16 than for the inner tube member 12. In general, the material and the wall thickness of the casing 16 should be such as to provide good flexibility commensurate with sufficient strength to accommodate, without rupture or permanent distortion, any radial loads imposed on it by the sheath 14 during conduit flexing.

In the particular embodiment shown in FIGURES 1 and 2, the sheath 14 is formed by a full complement of metal wires 18, there being room in the complement, however, for slight spacing between the wires. As alluded to previously, such slight spacing is advantageous in that it reduces frictional engagement between adjacent wires and hence imparts better flexing characteristics to the conduit. For optimum conduit strength, particularly tensile strength, it is highly desirable that at least some and preferably a majority of the wires be of metal, and more specifically a high tensile strength metal such as steel; however, such is not essential and the term "wire" as used herein is intended to comprehend not only metal wire but also duplicate structures, i.e. filaments, of organic plastics or the like. Such wires can be either of unitary structure, i.e., monofilaments, or they can be in the form of a multiplicity of filaments twisted to form a strand. Further, the sheath of wires or the individual wires can be of composite structure, for example plastic and metal, as covered in the U.S. patent application of Donald R. Pierce alluded to above. For optimum strength it is of course important that the sheath comprise a full complement of wires though for reasons mentioned previously, slight spacings are left between the wires as is the case in the embodiment shown in FIGURE 2. If desired, the capacity of the sheath to accommodate high radial loads can be further enhanced by helically winding a wire or fiber roving on a relatively short lead around the sheath 14; that is, between the sheath and the casing 16, as shown in the aforementioned Cadwallader patent.

Figure 3:
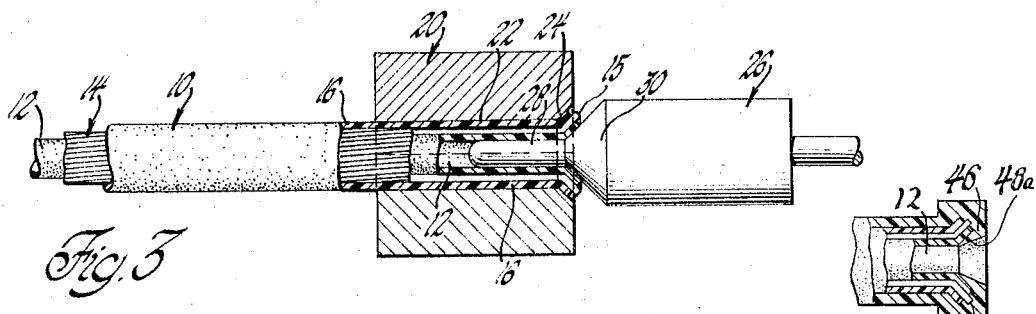
FIGURE 3 is a side view, partially in section and with parts broken away, of the conduit shown in FIGURE 1, but in the course of a processing operation.

Referring now to FIGURE 3, in accordance with one preferred embodiment of the invention, the end of the conduit 10 (core element 18 not being included) is placed in a metal die 20 having a cylindrical bore 22 sized to snugly receive the conduit and terminating at one end with a flared or frusto-conical shaped surface 24. With the conduit so positioned, with its free end adjacent and concentric with the flared surface 24, a punch 26 is driven into the conduit as shown. The punch has a forward cylindrical portion 28 which slides snugly into the inner tube member 12, and a frusto-conical portion 30 which engages the end of the conduit and hence flares it outwardly against the surface 24. The pressure applied is sufficient to cause the plastic and wires at the end of the conduit to take a set and hence retain the flared shape when the punch 26 is withdrawn.

Figure 5A:
FIGURE 5a is a fragmentary view of a portion of the conduit of FIGURE 5 illustrating a modified end fitting made in accordance with the invention.
Figure 4:
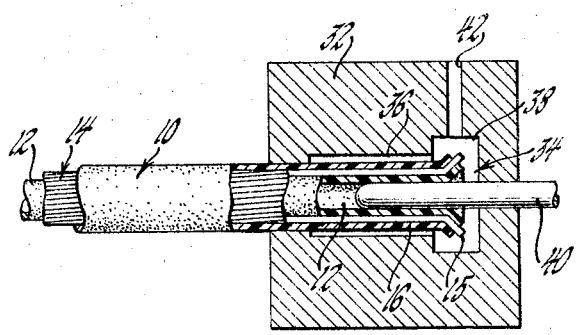
FIGURE 4 is a view similar to that in FIGURE 3, but illustrating a subsequent processing operation, that of molding the fitting, in accordance with the present invention.
Figure 5:
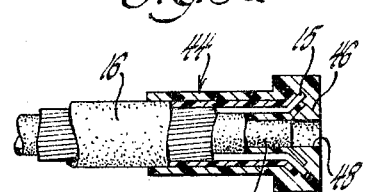
FIGURE 5 is a view, partially in section and with parts broken away, of a conduit embodying the invention and resulting from the processing operation illustrated in FIGURE 4.

And now with reference to FIGURE 4, as the key step in the process of this invention, the end of the conduit is positioned in a mold 32 having a cavity 34 which is of the shape of the desired fitting. In the FIGURE 4 embodiment, the mold cavity comprises an elongate cylindrical portion 36 which concentrically surrounds the end portion of the inserted conduit adjacent its flared end and communicating with a cylindrical portion 38 of relatively large diameter which concentrically encloses the flared end. To complete the mold cavity, a pin 40 projects through the mold end wall into the inner tube member 12 of the conduit. With the conduit so positioned in the mold, a suitable thermoplastic is injected through opening 42 into the mold cavity under pressure sufficient to cause the plastic to completely fill the cavity. After the plastic is hardened, the split mold is opened, the pin withdrawn, and the finished conduit, as shown in FIGURE 5, removed. During this molding operation the fitting is not only molded to its desired shape but is also intimately bonded to the end portion of the conduit thereby providing a strong, durable attachment. As can be seen in FIGURE 5, the resulting fitting 44 has an inwardly extending annular flange 46, the inner surface 48 of which defines a bore which is aligned with and has the same diameter as that of the inner tube member 12. This annular flange abuts the ends of the wires 15 and hence assures against their being worked out of the assembly by reason of repeated flexing or otherwise. Because the fitting is of plastic and hence has some inherent resiliency, there is adequate accommodation for the slight amount of sheath wire movement that takes place when the conduit is flexed. The resiliency of the bonded connection and of the casing itself supplements that of the flange 46 in this regard. Hence, the plastic fitting and its bonded connection to the casing provide excellent conduit flexibility, optimum assurance against the sheath wires working out of the conduit, and all without any impairment to strength. The flared end of the conduit which is imbedded in the plastic fitting provides a mechanical interlock which complements the bonded connection between the fitting and the conduit thereby adding further strength to the connection.

It is much preferred that the plastic used for the fitting be a thermoplastic and that operation be one of injection molding; however, it will be understood that in its broader scope the invention comprehends the use of other types of molding operations and the use of thermosetting resins. Any of the well known organic plastics may be used as the material for the fitting, for example, nylon, Teflon, the synthetic elastomers, the polyvinyls or, as is most advantageous, the polyalkylenes such as polyethylene, polypropylene or their copolymers. It will be obvious of course that the end of the conduit against which the fitting is molded should be free of grease and otherwise clean to assure a good bond. The temperature of the plastic during molding should preferably be somewhat higher than the softening temperature of the plastic casing so that during molding there is some penetration or diffusion of the molded plastic into the plastic of the casing, and vice versa, thereby providing excellent fusion and hence an optimum bond between the fitting and the casing. In the particular embodiment shown, the casing was made of a polyethylene-butene copolymer (available on the market as Marlex No. 5003 from the Phillips Chemical Company of Bartlesville, Oklahoma) having a softening temperature of about 255° F.; this same polyethylene copolymer was used as a material for the fitting and was injection molded at a temperature on the order of 400° F., an excellent durable bond resulting between the fitting and the casing.

Figure 6:
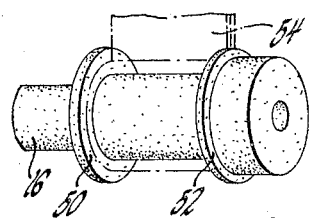
FIGURE 6 is a perspective view of a conduit with a modified end fitting made in accordance with the invention.
Figure 7:
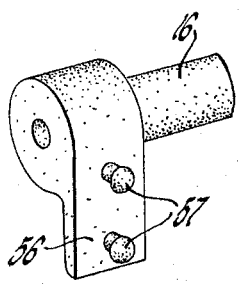
FIGURE 7 is a perspective view of another modification of the invention.

FIGURES 6 and 7 show modifications of the conduit and end fittings which are similar to that shown in FIGURE 5 except for the external shape of the fitting. These modifications illustrate that the molded plastic fitting can be shaped as desired to meet particular needs. In the FIGURE 6 modification, the fitting is formed with spaced annular flanges 50 and 52 to serve as end barriers for attachment means in the form of a split annular metal clamp 54 used to secure the conduit to a support. The FIGURE 7 modification includes a tangentially extending flat tab 56 having integrally formed thereon a pair of headed projections 57 forming attachment means, the inherent resiliency of which is sufficient to allow them to be snapped into suitable holes in a metal plate (not shown) to thereby secure the conduit to a support. As a desirable variation of this FIGURE 7 structure, a radially extending flat flange can be used with a hole therethrough having a metal eyelet secured therein to serve as a reinforced opening for a screw fastener. By suitably supporting a channel shaped metal eyelet in the mold, with the channel facing radially outwardly, when the plastic is injected, as in FIGURE 4, to form the end fitting, the eyelet can be conveniently and permanently secured to the fitting in this one operation; the plastic flows into the channel and thereby bonds and interlocks it to the fitting. It will be manifest such external shapes are also well suited to fittings formed on the conduit, in accordance with the invention, intermediate the conduit terminal portions.

Figure 8:
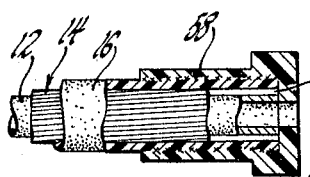
FIGURE 8 is a view, partially in section and with parts broken away, of still another embodiment of the invention.

FIGURE 8 shows an embodiment of the invention similar to that of FIGURE 5 except that the end of the conduit, to which the plastic fitting 58 is molded and bonded, is not flared. The method for manufacturing the FIGURE 8 embodiment is therefore the same as that described above except that the flaring operation as shown in FIGURE 3 is eliminated. Because this operation is eliminated, the FIGURE 8 fitting can be manufactured somewhat less expensively than that shown in FIGURE 5 though it does not have the added strength resulting from the mechanical interlock created by the relationship of the flared portion and the plastic fitting. However, the tensile and other load carrying characteristics of the FIGURE 8 embodiment are ample for most conduit uses, the casing-to-fitting bond resulting from the molding of the fitting to the casing providing excellent strength.

It will be understood, as alluded to previously, that fittings made in accordance with the invention may and generally will be used in combination with metal parts to provide the full attachment assembly. With reference to the FIGURES 5 and 8 embodiments, for example, a split annular metal clamp, or a threaded sleeve having a narrowed end cooperative with the enlarged end portion of the fitting can be used to complete the attachment assembly. Alternatively, the end of the fitting can be molded with an external screw thread so it can be threaded into a metal or other member. A metal part can also be advantageously secured to the plastic fitting as described above with reference to the securement of an eyelet. For example, in one such preferred embodiment, a metal part with a cylindrical portion, similar to the part shown at 54 in FIGURE 6, was supported in the mold, in abutting relationship with the wall thereof, into which the plastic was injected to form the fitting. In this manner, the metal part was securely imbedded in and bonded to the plastic end fitting by way of the molding operation, the appearance of the finished fitting being substantially identical to that shown in FIGURE 6. Hence, by way of a single operation a plastic end fitting with a metal attachment bonded thereto can be formed and bonded to the conduit.

In addition to retaining the sheath wires in the assembly without impairing flexibility, the radially inwardly extending flange of the plastic fitting, as shown at 46, also serves the extremely useful purpose of providing a smooth bearing surface for the movable core member. Being of plastic, the surface of the flange is relatively soft as compared with steel or the like, and hence there is substantially no wear on the core element by way of its contact with such surface. Whereas in the embodiments shown in FIGURES 5 and 8, the inner surface of the radially inwardly extending flange, surface 48 in FIGURE 5, is of the same diameter as that of the inner surface of the tube 12, it will sometimes be advantageous to size the bore defined by the inner surface of said flange with a somewhat lesser diameter than the internal diameter of the tube 12. This is particularly advantageous where a relatively loose and therefore low friction fitting is used between the core element 18 and the conduit, since the slightly lessened diameter of the bore through the plastic end fitting serves the important purpose of centering the core wire within the conduit at the ends thereof and thereby better insures minimum frictional contact between the core and the inner tube of the conduit. If desired, the bore through the end fitting instead of being cylindrical as shown, for example at 48 in FIGURE 5, can be conical, tapering inwardly toward the end of the tube 12 as shown at 48a in FIGURE 5a, to thereby provide a low friction flared entry for the core element. To accomplish such a flared structure, it is only necessary to appropriately shape the pin 40 (see FIGURE 3) about which the fitting is molded. Where the bore of the fitting is desired to be of slightly lesser diameter than the tube 12, as described above, the pin 40 is, of course, made of slightly lesser diameter than as shown in FIGURE 3 and there will therefore be an annular clearance between the pin and the inner surface of the tube 12 at the time the plastic is injected. However, since only a predetermined amount of plastic is injected, and since the plastic rapidly cools about the pin, the plastic will not flow to any disadvantageous extent into tube 12.

For some installations it is desirable to provide a predetermined amount of friction between the core element and the conduit end-fitting assembly. For example, where the control is used for a closure plate on an air vent in the front of an automobile, a certain amount of friction against free movement of the core is necessary to prevent the closure plate from closing due to air pressure while the vehicle is in motion. It is difficult if not impossible to accomplish the most desirable predetermined amount of frictional contact by sizing the diameters of the core element and the inner tube of the conduit to be in rubbing contact, such diminishes overall efficiency too greatly, particularly where the conduit must be flexed to arcuate shape around corners or the like. In accordance with the present invention the desired frictional contact can be accomplished by appropriately sizing the bore in the plastic end fitting. That is, the core element can be sized with a lesser diameter than that of the tube member 12 so that it can slide to and fro quite easily within the conduit, and the diameter of the bore through the end fitting can be made the same or very slightly less than the diameter of the core element such that there is frictional contact between the core element and the plastic end fitting. Since the plastic is relatively soft and resilient, an excellent predetermined frictional contact can be accomplished. Further, because the plastic end fitting is formed and secured onto the conduit about a pin which is inserted into the inner tube 12 of the conduit during such forming, there is assurance of perfect concentricity between the bore in the end fitting and the tube 12. Such perfect concentricity is difficult, if not impossible, to obtain by means of conventional metal end fittings since even slight manufacturing discrepancies which invariably incur in the manufacture of the fittings and in the manufacture of the conduit result in frequent instances of eccentricity between the fitting and the conduit.

Even though the casing 16 is quite thin, with a thickness less than 1/16" and generally no more than 1/32", the molded and bonded plastic fitting in combination with such casing and its associated sheath 14 is amply strong to withstand high tensile and other loads. The method of this invention serves to excellent advantage not only because it provides a much improved product but also because it is eminently suited to efficient manufacture of the conduits on a low cost high production basis. Hence, the invention provides an improved conduit at a lower cost.

While it is much preferred that the conduit have the composite inner tube—metal sheath—plastic casing structure shown and described, the invention in its broadest scope comprehends controls wherein other conduit structure, such as a tough flexible plastic tube, is used. Hence, it will be understood that while the invention has been described specifically with reference to certain embodiments thereof, various changes and modifications may be made all within the full and intended scope of the claims which follow.

I claim:

1. A flexible motion-transmitting control assembly comprising a flexible thin walled conduit susceptible of being radially deformed and having an outer surface of organic polymeric thermoplastic material and an inner unitary bore of plastic material, a flexible motion-transmitting core element mounted within and extending through and being engageable with said bore for movement axially relative thereto, axial movement of said core element imposing axial loads on said conduit, and a fitting of organic polymeric material molded on said outer surface of said conduit for attachment to a fixed support to secure said conduit thereto, the organic polymeric material of one of said outer surface of said conduit and said fitting being diffused into the organic polymeric material of the other thereof to form a bond therebetween to prevent relative axial movement between said fitting and said conduit as said core element is moved axially relative to the latter while maintaining said conduit substantially free of radial forces which would radially deform said conduit and said bore and interfere with movement of said core element relative to said bore.

2. A flexible motion-transmitting control assembly comprising a flexible conduit including an inner tubular member of low friction organic polymeric material defining a bore of substantially uniform cross section throughout the length thereof, at least one wire wrapped helically about said inner tubular member on a long lead and being shiftable relative to said inner tubular member as said conduit is flexed, and an outer smooth tubular casing of organic polymeric thermoplastic material enclosing said wire and said inner tubular member, a flexible motion-transmitting core element supported within and extending through said bore for movement axially relative to said conduit, substantially the entire length of said bore being engageable with said core element as the latter is moved within said conduit as the latter is flexed, and a fitting of organic polymeric thermoplastic material molded on said casing for attachment to a fixed support to secure said conduit thereto, the organic polymeric thermoplastic material of one of said casing and said fitting being diffused into the organic polymeric thermoplastic material of the other thereof to form a bond therebetween to prevent relative axial movement between said fitting and said conduit as said core element is moved axially relative to the latter, said bond maintaining said conduit substantially free of radial forces which would radially deform said casing and the uniform cross section of said bore of said inner tubular member and interfere with movement of said wire and said core element relative thereto.

3. A flexible motion-transmitting control assembly comprising a flexible conduit including a unitary bore of substantially uniform cross section throughout the length thereof and an outer smooth tubular surface of organic polymeric thermoplastic material, and at least one wire extending helically through said conduit on a long lead and being shiftable relative to said conduit as the latter is flexed, a flexible motion-transmitting core element supported within and extending through said bore for movement axially relative to said conduit, and a fitting of organic polymeric thermoplastic material molded on said outer surface of said conduit, the organic polymeric thermoplastic material of one of said outer surface of said conduit and said fitting being diffused into the organic polymeric thermoplastic material of the other thereof to form a bond therebetween to prevent relative axial movement between said fitting and said conduit as said core element is moved axially relative to the latter, said bond maintaining said conduit substantially free of radial forces which would radially deform the uniform cross section of said bore and interfere with movement of said core element relative thereto.

4. The control assembly as defined in claim 3 wherein said fitting is molded about one end of said conduit and includes an annular flange extending radially inwardly over said one end of said conduit and defining an opening substantially axially aligned with said bore, said core element extending through and being movably supported within said bore.

5. The control assembly as defined in claim 4 wherein said opening has a diameter less than the diameter of said bore.

6. The control assembly as defined in claim 4 wherein said opening is conically divergent from said one end of said conduit.

7. The control assembly as defined in claim 3 further comprising attachment means carried by said fitting and attachable to a fixed support to secure said conduit thereto.

8. The control assembly as defined in claim 7 further including means mechanically interlocked with said fitting and being attachable to a fixed support to secure said one end of said conduit thereto as said core element is moved within said conduit.

9. The control assembly as defined in claim 7 further including means molded to said fitting and being attachable to a fixed support to secure said one end of said conduit thereto as said core element is moved within said conduit.

10. A flexible motion-transmitting control assembly comprising a flexible conduit including an inner tubular member of low friction organic polymeric material defining a bore of substantially uniform cross section throughout the length thereof, at least one wire wrapped helically about said inner tubular member on a long lead and being shiftable relative to said inner tubular member as said conduit is flexed, and an outer smooth tubular casing of organic polymeric thermoplastic material enclosing said wire and said inner tubular member, a flexible motion-transmitting core element supported within and extending through said bore for movement axially relative to said conduit, a fitting of organic polymeric thermoplastic material molded on said casing, the organic polymeric thermoplastic material of said casing and said fitting being diffused into each other to form a bond therebetween to prevent relative axial movement between said fitting and said conduit as said core element is moved axially relative to the latter, said bond maintaining said conduit substantially free of radial forces which would radially deform said casing and the uniform cross section of said bore and interfere with movement of said wire and said core element relative thereto, and attachment means carried by said fitting and attachable to a support to secure said conduit thereto.

11. The control assembly as defined in claim 10 wherein said fitting is molded about one end of said conduit and includes an annular flange extending radially inwardly over said one end of said conduit and defining an opening substantially axially aligned with said bore, one end of said wire adjacent said one end of said conduit being abuttable with said flange, said core element extending through and being movably supported within said opening.

12. The control assembly as defined in claim 11 wherein said opening has a diameter less than the diameter of said bore.

13. The control assembly as defined in claim 11 wherein said opening is conically divergent from said one end of said conduit.

14. The control assembly as defined in claim 11 wherein said attachment means is mechanically interlocked with said fitting.

15. The control assembly as defined in claim 11 wherein said attachment means is molded to said fitting.

16. The control assembly as defined in claim 11 wherein there are a plurality of wires wrapped helically about said inner tubular member on a long lead, said wires being shiftable relative to each other and said inner tubular member as said conduit is flexed.

References Cited by the Examiner

UNITED STATES PATENTS

| | | | |
|---|---|---|---|
| 1,649,139 | 11/1927 | Sonen | 285—291 X |
| 1,982,732 | 12/1934 | Fletcher et al. | 285—284 X |
| 2,046,545 | 7/1936 | Brickman et al. | 285—291 X |
| 2,520,372 | 8/1950 | Phillips | 285—149 |
| 2,550,669 | 5/1951 | Brickman | 285—284 X |
| 2,667,369 | 1/1954 | Harper | 285—149 |
| 2,685,458 | 8/1954 | Shaw | 285—149 |
| 2,685,459 | 8/1954 | Panagrossi | 285—149 |
| 2,696,642 | 12/1954 | Kohrn | 264—275 |
| 2,735,699 | 2/1956 | Chadbourne | 285—61 X |
| 2,787,024 | 4/1957 | Smith | 264—275 |
| 2,801,530 | 8/1957 | Holt | 64—3 |
| 2,871,718 | 2/1959 | Schroeder | 74—501 |
| 2,884,771 | 5/1959 | Holt | 64—4 |
| 2,940,778 | 6/1960 | Kaiser | 285—149 X |
| 3,061,503 | 10/1962 | Gould et al. | 285—21 X |
| 3,063,303 | 11/1962 | Cadwallader | 128—122 X |
| 3,120,401 | 2/1964 | Brown | 285—284 X |
| 3,190,084 | 6/1965 | Moon et al. | 64—3 |

FOREIGN PATENTS

| | | |
|---|---|---|
| 237,785 | 2/1962 | Australia. |
| 1,034,729 | 4/1953 | France. |
| 511,989 | 8/1939 | Great Britain. |
| 829,179 | 2/1960 | Great Britain. |
| 856,040 | 12/1960 | Great Britain. |
| 920,448 | 3/1963 | Great Britain. |
| 505,986 | 12/1954 | Italy. |

MILTON KAUFMAN, *Primary Examiner.*

THOMAS F. CALLAGHAN, *Examiner.*

D. H. THIEL, *Assistant Examiner.*